US012759207B2

(12) United States Patent
Silva et al.

(10) Patent No.: US 12,759,207 B2
(45) Date of Patent: Oct. 13, 2026

(54) LOW PERMEATION STRUCTURES FROM RECYCLED COMPOSITE MATERIAL

(71) Applicant: FMC Technologies, Inc., Houston, TX (US)

(72) Inventors: Gabriel Silva, Houston, TX (US); Anh Tuan Do, Paris (FR)

(73) Assignee: FMC Technologies, Inc., Houston, TX (US)

( * ) Notice: Subject to any disclaimer, the term of this patent is extended or adjusted under 35 U.S.C. 154(b) by 600 days.

(21) Appl. No.: 18/348,512

(22) Filed: Jul. 7, 2023

(65) Prior Publication Data

US 2025/0010535 A1 Jan. 9, 2025

(51) Int. Cl.
*B29C 48/00* (2019.01)
*B29B 17/04* (2006.01)
(Continued)

(52) U.S. Cl.
CPC ........ *B29C 48/022* (2019.02); *B29B 17/0412* (2013.01); *B29C 48/09* (2019.02); *B33Y 70/10* (2020.01); *B33Y 80/00* (2014.12); *F16L 9/121* (2013.01); *F16L 9/133* (2013.01); *B29K 2071/00* (2013.01); *B29K 2105/26* (2013.01); *B29K 2307/04* (2013.01); *B29L 2023/22* (2013.01)

(58) Field of Classification Search
CPC ....... B29C 48/022; B29C 48/09; B33Y 80/00; B33Y 70/10; B29B 17/0412; F16L 9/121; F16L 9/133; B29K 2071/00; B29K 2105/26; B29K 2307/04; B29L 2023/22
USPC .......................................................... 138/153
See application file for complete search history.

(56) References Cited

U.S. PATENT DOCUMENTS

| | | | | |
|---|---|---|---|---|
| 5,393,536 A * | 2/1995 | Brandt | B29C 48/12 | |
| | | | 264/209.6 | |
| 12,447,518 B2 * | 10/2025 | Joshi | B21C 25/02 | |

(Continued)

FOREIGN PATENT DOCUMENTS

| | | |
|---|---|---|
| CN | 105324232 A | 2/2016 |
| EP | 0636428 A1 | 2/1995 |

(Continued)

OTHER PUBLICATIONS

AFT Fluorotec, Peek and Hydrogen Embrittlement, Oct. 25, 2022, 1 page.

(Continued)

*Primary Examiner* — David R Deal
(74) *Attorney, Agent, or Firm* — Erise IP, P.A.

(57) ABSTRACT

Systems, methods, and devices for providing a low permeability pressure containing structure from high performance recycled composite material, such as polymer carbon fiber composite. One or more recycled scrap composite parts are mechanically processed to form a plurality of fragments based on protected carbon fiber, which are then formed into the pressure containing structure. The distribution of the plurality of fragments and fibers included therein generate a tortuous effect that decreases the permeability of the pressure containing structure, such that the pressure containing structure is suitable for transporting and storing gases and other fluids that may corrode traditional steel pressure structures.

20 Claims, 5 Drawing Sheets

(51) Int. Cl.

| | |
|---|---|
| ***B29C 48/09*** | (2019.01) |
| ***B29K 71/00*** | (2006.01) |
| ***B29K 105/26*** | (2006.01) |
| ***B29K 307/04*** | (2006.01) |
| ***B29L 23/00*** | (2006.01) |
| ***B33Y 70/10*** | (2020.01) |
| ***B33Y 80/00*** | (2015.01) |
| ***F16L 9/12*** | (2006.01) |
| ***F16L 9/133*** | (2006.01) |

(56) References Cited

U.S. PATENT DOCUMENTS

| | | | | |
|---|---|---|---|---|
| 2006/0251829 | A1* | 11/2006 | Braun | B29B 17/02 428/2 |
| 2010/0136269 | A1* | 6/2010 | Andersen | B28B 11/003 428/34.4 |
| 2010/0237531 | A1* | 9/2010 | Lyons | B29C 33/52 264/132 |
| 2015/0284541 | A1* | 10/2015 | Urayama | C10B 1/02 422/164 |
| 2015/0367448 | A1* | 12/2015 | Buller | H05B 6/68 219/74 |
| 2019/0323634 | A1* | 10/2019 | Zhang | F16L 9/14 |
| 2020/0172669 | A1* | 6/2020 | Song | C08G 65/485 |
| 2021/0114283 | A1* | 4/2021 | Bertolotti | B29C 53/62 |
| 2022/0126489 | A1 | 4/2022 | Feerick et al. | |
| 2024/0288100 | A1* | 8/2024 | Epsztein | B32B 27/12 |

FOREIGN PATENT DOCUMENTS

| | | | |
|---|---|---|---|
| WO | 2014020532 | A1 | 2/2014 |
| WO | 2020127790 | A1 | 6/2020 |
| WO | 2021259757 | A1 | 12/2021 |

OTHER PUBLICATIONS

IEMAI 3D, What we want? Print more materials, All for applications, 1 Page, www.iemai3d.com.

Lambiase Francesco, A State-of-the-Art Review on Advanced Joining Processes for Metal-Composite and Metal-Polymer Hybrid Structures. Materials (Basel). Apr. 1, 20210, 36 pages, https://www.ncbi.nlm.nih.gov/pmc/articles/PMC8069853/.

M. Roux, et al., Processing And Recycling of A Thermoplastic Composite Fibre/Peek Aerospace Part, ECCM16—16th European Conference On Composite Materials, Seville, Spain, 8 pages Jun. 2014.

Pegoretti, Alessandro, Towards Sustainable Structural Composites: A Review on The Recycling of Continuous-Fiber-Reinforced Thermoplastics, Advanced Industrial and Engineering Polymer Research 4 (2021) 105-115, http://www.keaipublishing.com/aiepr.

R. R. Barth, et al., Polymers for Hydrogen Infrastructure and Vehicle Fuel Systems: Applications, Properties, and Gap Analysis, Sandia Report SAND2013-8904 Unlimited Release Printed Oct. 2013, 52 pages, Sandia National Laboratories.

SNC Plastic, Peek CF30 Tube—30% Carbon Fiber Filled, 2023 SNC Plastic Co.,Ltd., 8 pages, https://www.sncplastic.com/peek-cf30-tube-30-carbon-fiber-filled/.

PCT Patent Application PCT/US24/34896 International Search Report and Written Opinion of the International Searching Authority issued Oct. 1, 2024.

PCT Patent Application PCT/US2024/34896 International Preliminary Report on Patentability issued Jan. 9, 2026.

* cited by examiner

LOW PERMEATION STRUCTURES FROM RECYCLED COMPOSITE MATERIAL

BACKGROUND

1. Field

Embodiments of the present disclosure relate to low permeation structures. More specifically, embodiments of the present disclosure relate to forming low permeation structures from recycled composite material.

2. Related Art

Pressure containing structures such as tubing, valves, and connectors associated therewith have been used to contain pressurized fluids. However, the typical steel pipe liners included within pressurized piping for transporting fluids such as gaseous hydrogen and carbon dioxide are prone to corrosion and fragmentation, for example, due to reaction with hydrogen. Accordingly, composite materials have been used in place of metals within hydrogen transport pressure containing structures. However, the cost of said composite materials is prohibitive and the manufacturing processes to produce said composite materials are energy intensive.

SUMMARY

Embodiments of the present disclosure solve the above-mentioned problems by providing a non-corrosive, low permeability pressure containing structure produced from recycled composite material. Scrap parts comprising composite material are recycled via mechanical recycling to produce a plurality of fragments such that fibers within the fragments are preserved. The fragments are then formed into a final structure, such as a pressure containing tube or other pressure containing structure in which the preserved fibers aid in generating a tortuous path to thereby decrease a permeability of the final structure.

In some aspects, the techniques described herein relate to a method of producing a pressure containing structure, the method including: receiving one or more recycled parts, the one or more recycled parts including a carbon fiber composite material; mechanically processing the one or more recycled parts into a plurality of fragments with a random fiber distribution; and forming, via a forming process, the plurality of fragments into the pressure containing structure thereby producing the pressure containing structure, wherein the random fiber distribution of the plurality of fragments generates a tortuous effect thereby producing a low gas permeability for the pressure containing structure for substantially containing a fluid within the pressure containing structure.

In some aspects, the techniques described herein relate to a method, wherein the carbon fiber composite material includes carbon fiber polyether ether ketone, and wherein an initial matrix of the carbon fiber composite material protects a plurality of short fibers disposed therein.

In some aspects, the techniques described herein relate to a method, wherein the forming process includes an extrusion process using an extruder device.

In some aspects, the techniques described herein relate to a method, wherein the forming process includes an additive manufacturing process using a 3D printer, the method further including: processing the plurality of fragments into a powder form including a plurality of granules with an average particle diameter of about 10 micrometers to about 100 micrometers; and providing the plurality of granules to the 3D printer.

In some aspects, the techniques described herein relate to a method, further including: selecting a fragment size for the plurality of fragments based on a pressure level associated with the pressure containing structure.

In some aspects, the techniques described herein relate to a method, wherein the forming process includes an injection molding process using an injection mold.

In some aspects, the techniques described herein relate to a method, further including: forming a first layer of the pressure containing structure using a first portion of the plurality of fragments; and forming a second layer of the pressure containing structure using a second portion of the plurality of fragments.

In some aspects, the techniques described herein relate to a method of producing a pressure containing structure, the method including: receiving one or more recycled parts, the one or more recycled parts including a carbon fiber composite material; mechanically processing the one or more recycled parts to form a plurality of fragments; and forming the pressure containing structure by fusing the plurality of fragments into the pressure containing structure, wherein the plurality of fragments are selectively oriented to generate a tortuous effect thereby producing a low gas permeability for the pressure containing structure for substantially containing a fluid within the pressure containing structure.

In some aspects, the techniques described herein relate to a method, wherein the plurality of fragments are fused into the pressure containing structure via an extrusion process using an extrusion device.

In some aspects, the techniques described herein relate to a method, further including: forming a first layer of the pressure containing structure using a first portion of the plurality of fragments selectively oriented in a first selected direction; and forming a second layer of the pressure containing structure using a second portion of the plurality of fragments selectively oriented in a second selected direction distinct from the first selected direction.

In some aspects, the techniques described herein relate to a method, further including: forming a third layer of the pressure containing structure using a third portion of the plurality of fragments selectively oriented in a third selected direction distinct from the second selected direction.

In some aspects, the techniques described herein relate to a method, wherein mechanically processing the one or more recycled parts includes feeding the one or more recycled parts into a cutting device configured to cut the one or more recycled parts along an axis parallel to a fiber direction of a plurality of fibers of the carbon fiber composite material to thereby form the plurality of fragments while preserving the plurality of fibers.

In some aspects, the techniques described herein relate to a method, further including: adding additional carbon fiber material to the plurality of fragments.

In some aspects, the techniques described herein relate to a method, further including: adding an additional polymer material to the plurality of fragments prior to forming the pressure containing structure.

In some aspects, the techniques described herein relate to a pressure containing pipe including: a carbon fiber polyether ether ketone (PEEK) material configured to provide a low permeability pressure seal for containing a fluid inside the pressure containing pipe; and a plurality of fused mechanically recycled fragments including the carbon fiber PEEK material, wherein the carbon fiber PEEK material has a random fiber distribution that generates a tortuous effect to thereby reduce a permeability of the pressure containing pipe.

In some aspects, the techniques described herein relate to a pressure containing pipe, wherein the pressure containing pipe is configured to contain a pressurized gaseous hydrogen fluid disposed therein, and wherein the carbon fiber PEEK material prevents corrosion of the pressure containing pipe.

In some aspects, the techniques described herein relate to a pressure containing pipe, wherein the carbon fiber PEEK material includes a concentration of between 20% to 50% carbon fiber by volume.

In some aspects, the techniques described herein relate to a pressure containing pipe, further including: a first layer of the carbon fiber PEEK material including one or more first fibers oriented in a first direction; and a second layer of carbon fiber PEEK material including one or more second fibers oriented in a second direction distinct from the first direction.

In some aspects, the techniques described herein relate to a pressure containing pipe, wherein the pressure containing pipe is configured to contain a pressurized hydrogen fluid.

In some aspects, the techniques described herein relate to a pressure containing pipe, wherein the pressure containing pipe is configured to contain a pressurized carbon dioxide fluid.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
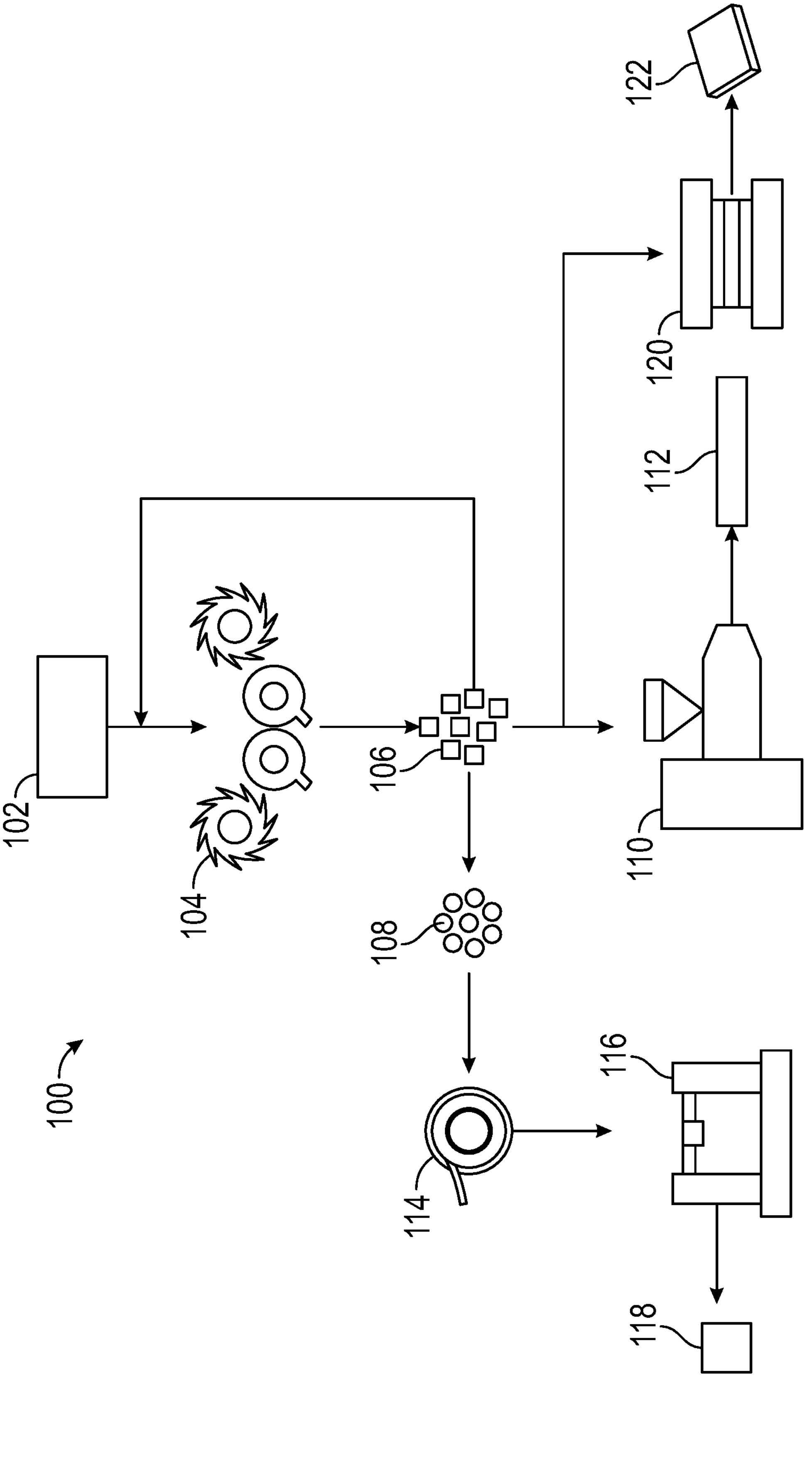
FIG. 1 illustrates an exemplary flow diagram of a composite recycling process relating to some embodiments of the present disclosure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Polyether Ether Ketone (PEEK) is a high-performance thermoplastic material, which is sought after due to its material properties including chemical resistance, high-temperature performance, and excellent mechanical strength across a broad temperature range. PEEK has been used as a component in composite material applications. For example, PEEK can be reinforced with additives such as carbon fiber to further increase material properties of the PEEK without increasing weight and even decreasing the overall weight in some cases. Composite materials such as carbon fiber reinforced PEEK display improved properties compared to virgin PEEK material such as lighter weight, increased strength, and lower fluid permeability. Additionally, the high temperature PEEK material protects the carbon fiber suspended therein from shearing during processing and handling, as well as high temperature operations. However, such composite materials are typically high cost and rely on energy and time intensive processes for production. Accordingly, embodiments of the present disclosure contemplate recycling composite materials that have already been produced and used. In some embodiments, scrap composite material is recycled, reprocessed, and formed into new structures without degradation to the material properties. Further, in some embodiments, the recycling fabrication process described herein provides improvements in certain material properties compared to the original composite material.

Embodiments of the present disclosure provide a reduction in the carbon production associated with manufacturing pressure containing structures. Specifically, initial production of composite materials, such as carbon fiber manufacturing and unidirectional tape fabrication, generate large amounts of carbon dioxide and other pollutants such as trichloropropane (TCP). Said manufacturing processes are also extremely energy demanding due to the cooling and heating associated therewith. By recycling composite materials that have already been generated and used, the carbon production to produce new structures is significantly reduced. For example, embodiments of the present disclosure contemplate mechanically recycling components including carbon fiber PEEK material to preserve material properties of the high-performance composite material without producing additional pollutants or relying on energy intensive processes.

Embodiments of the present disclosure further contemplate using mechanically recycled composite materials to form pressure containing structures and other structures. In some embodiments, high performance composite structures are recycled to utilize the benefits of the high performance materials without the costs associated with generating new high performance materials. The recycled composite materials are processed into a plurality of fragments and then formed into a new structure in any of a selectively oriented distribution, a random distribution, or combinations thereof. For example, the fragments may be aligned to preserve a distribution in a particular advantageous direction based on a specific application of the structure, or randomly distributed in a variety of random orientations to provide a reduction in the fluid permeability of the structure due to a tortuous path generated by the random orientation.

FIG. 1 illustrates an exemplary flow diagram of a composite recycling process 100 relating to some embodiments of the present disclosure. The composite recycling process 100 includes one or more recycled scrap parts such as scrap part 102. The scrap part 102 may include any form of recycled scrap component such as any of recycled turbine blades, tubing, aircraft components and other aerospace components, unidirectional tape, and other scrap components formed of composite material.

In some embodiments, the scrap part 102 comprises a composite material such as, for example, a Carbon Fiber (CF) Polyether Ether Ketone (PEEK) material. In some embodiments, the scrap part 102 comprises a continuous fiber reinforced thermoplastic composite including a plurality of fibers arranged in a matrix extending across a length of the scrap part 102. The scrap part 102 is provided into a mechanical recycling device 104, such as a grinder, shredder, or other suitable mechanical recycling device that processes the scrap part 102 into a plurality of fragments 106. In some embodiments, the scrap part 102 is fed into the mechanical recycling device 104, which chops and shreds the scrap part 102 into the plurality of fragments 106. Additionally, in some embodiments, the plurality of fragments 106 may be cycled back through the mechanical recycling device 104 or another device any number of times for further processing. For example, the plurality of fragments 106 may be cut into smaller fragments.

In some embodiments, the plurality of fragments 106 are further processed and refined into a plurality of granules 108. For example, the plurality of fragments 106 may be placed again into the mechanical recycling device 104 or another subsequent mechanical recycling device for further chopping the plurality of fragments 106 into even smaller fibers. In one example, a series of mechanical recycling devices are contemplated with each subsequent device configured to process the recycled fibers into smaller fragments. Additionally, or alternatively, in some embodiments, a granulation process may be used to provide the plurality of granules 108 from a powder base substance. For example, the plurality of fragments 106 may be grinded and refined to form a powder substance, which is then formed into granules via the granulation process. The plurality of granules 108 may range in diameter from about 10 micrometers to about 100 micrometers. However, further embodiments are contemplated in which other size ranges for the plurality of granules 108 may be used. However, in some embodiments, the plurality of fragments 106 are not ground into a powder form as to preserve the structure of fibers within the fragments.

In some embodiments, the plurality of fragments 106 are provided to an extruder device 110. Alternatively, in some embodiments, the plurality of granules 108 may be provided to the extruder device 110. The extruder device 110 may be used to extrude either of the plurality of fragments 106 or the plurality of granules 108 into an extruded part 112. Further, in some embodiments, further processing steps may be applied to the plurality of fragments 106 prior to extrusion by the extruder device 110. For example, the plurality of fragments 106 may be heated and/or one or more adhesives may be added to the plurality of fragments 106, such as a glue or other suitable adhesive. In some embodiments, virgin PEEK material may be added to the plurality of fragments. Alternatively, or additionally, other suitable thermoplastic polymer materials may be added such as, for example, Polyether Imide (PEI) or Polyamide Imide (PAI). Further still, in some embodiments, the adhesive and heat may be applied to the plurality of fragments 106 during the extrusion process. Other similar processes such as injection molding may use the plurality of fragments 106 to produce ancillary or valve body components or piping, as well as other pressure containing structures and non-pressure containing structures of any suitable shape.

In some embodiments, the plurality of granules 108 may be further processed into a filament 114. For example, a similar extrusion process using the extruder device 110 may be used to extrude the plurality of granules 108 into the filament 114. Alternatively, in some embodiments, the plurality of fragments 106 is processed directly into the filament 114 without first forming granules 108. For example, the fragments 106 may be extruded to form the filament 114. The filament 114 is provided to an additive manufacturing device 116, such as a 3D printer or other suitable additive manufacturing device. Accordingly, the additive manufacturing device 116 receives the filament 114 and provides an additively manufactured part 118. The additively manufactured part 118 comprises the composite material present within the plurality of fragments 106. Additionally, the additively manufactured part 118 preserves properties of the plurality of fragments 106 due to the fibers still being present within the additively manufactured part 118.

In some embodiments, the plurality of fragments 106 are provided to a sheet formation device 120, such as a thermomechanical sheet forming press. The sheet formation device 120 may be used to compress the plurality of fragments 106 to form a compressed sheet 122. The compressed sheet 122 may be used within a pressure containing structure. In some embodiments, a plurality of compressed sheets formed of recycled scrap composites may be used to form a pressure containing structure. Further still, in some embodiments, a plurality of sheets may be layered to further decrease a permeability of the pressure containing structure. In some embodiments, the compressed sheet 122 may be used as an external cover or internal liner for a tubing structure.

Figure 2A:
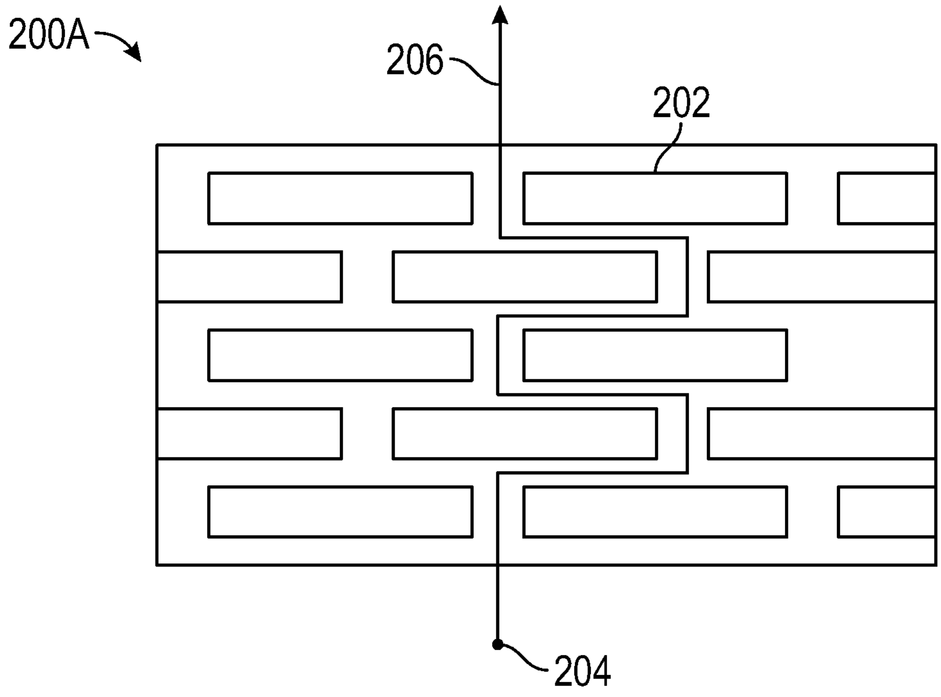
FIG. 2A illustrates an exemplary diagram of a selectively oriented distribution of fibers within a composite material relating to some embodiments of the present disclosure.

FIG. 2A illustrates an exemplary diagram of a selectively oriented distribution 200A of fragments within a composite material relating to some embodiments of the present disclosure. The selectively oriented distribution 200A comprises a plurality of fragments 202, which in the case of the selectively oriented distribution 200A, are selectively oriented in a particular direction. For example, the fragments

202 may be oriented in a longitudinal direction of a pressurized structure formed by the composite material. Further, embodiments are contemplated in which a first portion of the plurality of fragments are oriented in a first selected direction and a second portion of the plurality of fragments are oriented in a second selected direction distinct from the first direction. For example, the first portion of fragments may be oriented longitudinally while the second portion of fragments is oriented latitudinally.

In some embodiments, each fragment 202 comprises a plurality of fibers disposed therein. For example, the fragment may comprise a composite material such as PEEK with carbon fiber added therein. Accordingly, the carbon fiber is included within the fragments 202. In some embodiments, the fibers within the fragments 202 may be oriented in a known direction within the fragments. For example, the fibers may be oriented along a length of each respective fragment 202. Alternatively, in some embodiments, the fibers may be oriented in an unknown direction.

An exemplary gas molecule 204 is shown to portray a visualization of a tortuous path 206 of the gas molecule 204. The tortuous path 206 outlines an exemplary path of permeability for the gas molecule 204 to permeate through the composite material. Accordingly, the fragments 202 resist motion and permeation of gas particles by providing obstructions for the gas molecules such that the gas molecules cannot freely permeate through the composite material. The tortuous path 206 causes the composite material to have a relatively lower permeability due to obstruction by the fragments 202 (and fibers within the fragments), for example, as compared to a similar composite material that does not contain fragments 202, has fibers oriented parallel to the path of permeability, or otherwise has non-randomized fibers.

Tortuous effect, as used herein, refers to the material tortuosity of the composite material as produced by microstructural and macrostructural obstructions present within the composite material that produce a barrier to resist fluid permeation. The tortuous path 206, as described herein, generates a tortuous effect that resists mass transfer through the composite material. For example, the tortuous effect reduces the permeability by substantially preventing mass transfer of fluids contained within structures including the composite material. In some embodiments, the tortuous effect may be produced by a combination of the distribution of the plurality of fragments and the plurality of fibers included therein, such as carbon fiber additives that are added to the PEEK material.

Figure 2B:
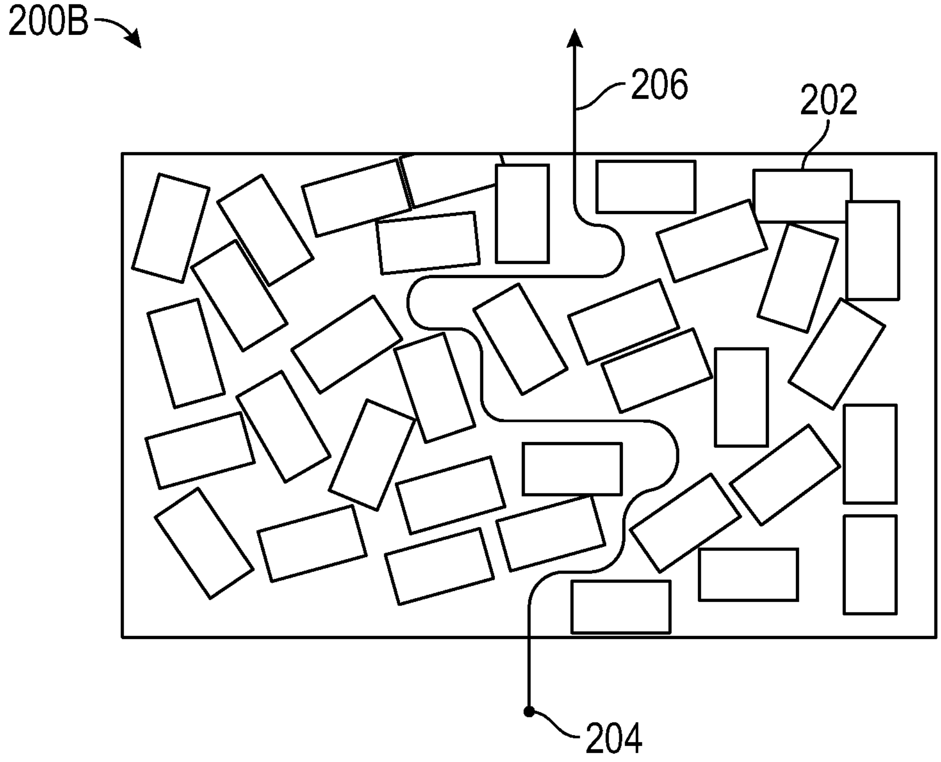
FIG. 2B illustrates an exemplary diagram of a randomly oriented distribution of fibers within a composite material relating to some embodiments of the present disclosure.

FIG. 2B illustrates an exemplary diagram of a randomly oriented distribution 200B of fragments within a composite material relating to some embodiments of the present disclosure. The randomly oriented distribution 200B comprises the plurality of fragments 202 positioned in a random distribution. For example, each fragment 202 may be oriented in a random direction within the composite material. Similar to the selectively oriented distribution 200A, as described above, the randomly oriented distribution 200B may generate a tortuous path 206 for the exemplary gas molecule 204. Further, embodiments are contemplated in which the distribution of the plurality of fragments 202 is selectively oriented in a plurality of distinct directions. For example, the fragments can be oriented in a variety of selected direction to increase protection against shearing and/or leakage of gases (and other fluids) therethrough. Accordingly, by using selected engineered orientations of the fragments, the properties of the resulting structure are less random and more predictable. As such, the distribution of fragments may be tailored to a particular application of the structure.

In some embodiments, the randomly oriented distribution 200B provides an even lower permeability when compared to the selectively oriented distribution 200A because the generated tortuous path 206 is more complex for the randomly oriented distribution 200B and thus, provides additional resistance to gases and other fluids to permeate the material. However, the randomly oriented distribution 200B may have less consistent properties compared to the selectively oriented distribution 200A by nature of the randomness of the distribution.

In some embodiments, an average fragment length may be selected for the plurality of fragments 106. For example, in some embodiments, an average fragment length may be selected of approximately one-fourth of an inch with an average fragment width of approximately one-eighth of an inch. In some embodiments, a maximum fragment length of the plurality of fragments 106 is selected to be approximately three-fourths of an inch. Alternatively, in some embodiments, other dimensions are contemplated for the plurality of fragments 106. For example, in some embodiments, the average dimensions of the plurality of fragments 106 may be selected based at least in part on one or more desired properties of the final structure such as a desired pressure level associated with a pressure containing structure. For example, in some embodiments, an average fragment length of one half of an inch may be selected to produce a particular permeability within the final structure. Further, in some embodiments, the dimensions of the plurality of fragments 106 may be selected based at least in part on an average size and length of the fibers included within the composite material such that the length and width of the fragments is larger than the average fiber length as to preserve a total length of the fibers within the fragments. In some embodiments, an arrangement and size of the plurality of fragments is selected to delay (or prevent) fluid diffusion through the resulting structure. Additionally, or alternatively, the arrangement and size may be selected to preserve a flexibility of the structure and withstand stress resulting from internal pressure. In some such embodiments, shorter fiber lengths provide an increased diffusion prevention and stress performance compared to longer fiber composites. In some embodiments, the fiber length and fragment size may be at least partially controlled by the selected grinding process or other mechanical recycling techniques.

Figure 3:
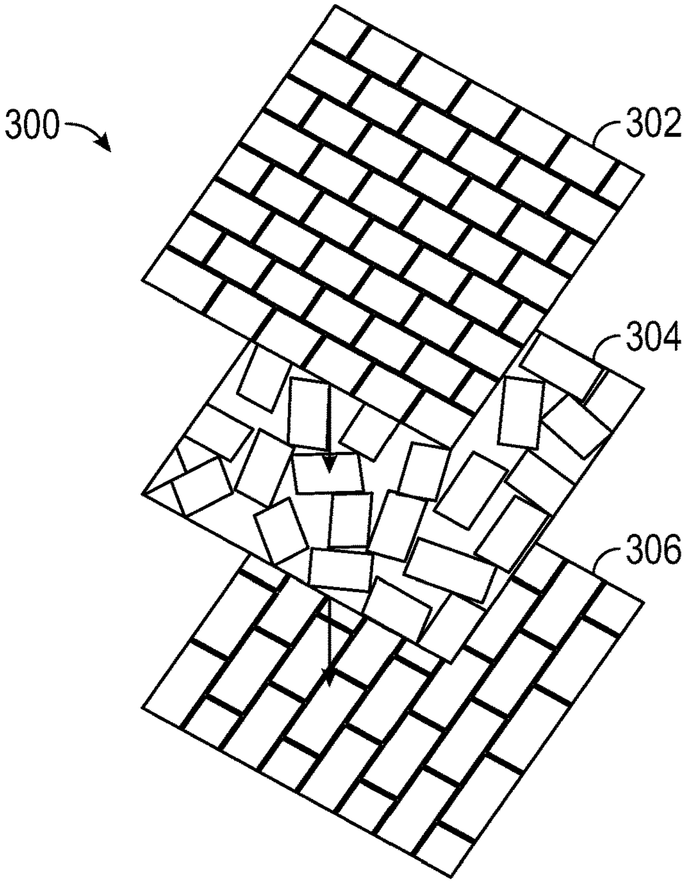
FIG. 3 illustrates an exploded view of an exemplary layered composite component relating to some embodiments of the present disclosure.

FIG. 3 illustrates an exploded view of an exemplary layered composite component 300 relating to some embodiments of the present disclosure. The layered composite component 300 comprises one or more layers of compressed composite material. For example, the one or more layers of compressed composite material may be formed by compressing the plurality of fragments 106. In some embodiments, the exemplary layered composite component 300 comprises a first layer 302, a second layer 304, and a third layer 306. The first layer 302 comprises the plurality of fragments 106 aligned in a first selected direction.

In some embodiments, the exemplary layered composite component 300 may be produced by pressing one or more layers of fragments 106 together into one or more compressed flat sheets of material, for example, using the sheet formation device 120 described above with respect to FIG. 1, or another suitable press process.

The first layer 302 comprises a plurality of fragments selectively oriented in a first direction, as shown. The second layer 304 comprises a plurality of fragments that are randomly oriented in a plurality of distinct directions. The third layer 306 comprises a plurality of fragments 106 selectively oriented in a second direction that is distinct from the first direction. In some embodiments, the second direction is perpendicular to the first direction, as shown. In some embodiments, the layer 304 may be added between two or more cross wound layers for increasing adhesion and preventing initiation of cracks. Further, the distribution of the second layer 304 prevents delamination of the structure by providing increased performance against interlaminar shear forces. In certain pressure containing applications utilizing composite material, such as, pipes or other structures, delamination and transverse crack formation are the most prominent failure modes. Another potential failure mode is along a preferred path of diffusion and leaks within the structure. Accordingly, the varying orientations of fragments within the layers 302, 304, and 306 provides increased protection from the above-mentioned failure modes. Specifically, the varying distributions of fragments (and fibers therein) and the tortuous path provided thereby, prevent diffusion and increase performance against shearing and delamination.

Alternatively, or additionally, embodiments are contemplated in which a different number of layers is used or where one or more of the layers are oriented in a different direction than as shown. Further, in some embodiments, the order of the layers may be different than as shown. For example, the first layer 302 may be compressed directly onto the third layer 306. Further still, in some embodiments, the exemplary layered composite component 300 comprises two or more layers with respective pluralities of fragments 106 oriented in random directions, for example, multiple instances of the second layer 304 may be included. Further, embodiments are contemplated in which extrusion techniques or co-extrusion techniques are used to produce a tailored lay-up of layered recycled composite material. For example, the extrusion techniques may be arranged to extrude the recycled composite material with known material properties respective to one or more known axis of the resulting structure, such as pressure containment and shear strength. Here, the resulting structure may be formed based on one or more expected parameters of an operating environment of the resulting structure. For example, if the pressure containing structure comprises a high pressure containing pipe, a cross section of the pipe may be increased via the extrusion process to reinforce the pressure containing properties of the pipe.

The exemplary layered composite component 300 is described and shown as a rectangular sheet. However, it should be understood that the exemplary layered composite component 300 may be included as a different shape. For example, in some embodiments, the layers may be added into any of a variety of 3-dimensional shapes. For example, in some embodiments, the exemplary layered composite component 300 may comprise a hollow tube or other object.

Figure 4:
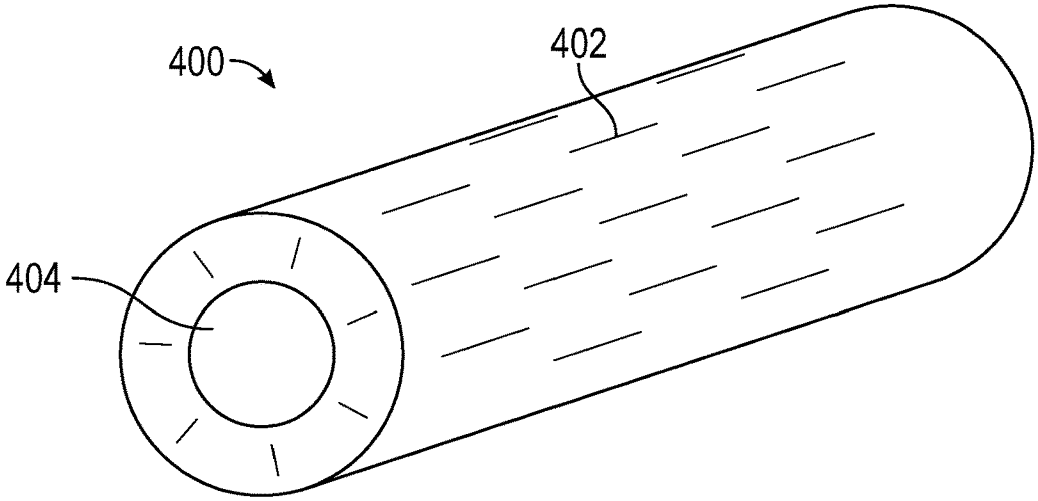
FIG. 4 illustrates an exemplary tubing structure formed of composite material relating to some embodiments of the present disclosure.

FIG. 4 illustrates an exemplary tubing structure 400 formed of composite material relating to some embodiments of the present disclosure. The tubing structure 400 comprises a plurality of selectively oriented fibers 402 oriented in a direction parallel to a length of the tubing structure 400. The tubing structure 400 may be formed using a recycled composite material using any suitable manufacturing process, such as any of the manufacturing processes shown and described above with respect to FIG. 1. For example, the tubing structure 400 may be formed using the extruder device 110 to extrude the plurality of fragments 106 or plurality of granules 108 into the tubing structure 400. Alternatively, in some embodiments, the tubing structure 400 may be formed via injection molding or co-extrusion. For example, a co-extrusion technique may be adapted for tailoring laminates constituting the composite structure.

In some embodiments, the plurality of fibers 402 are selectively oriented into a particular direction, as shown. Alternatively, in some embodiments, the tubing structure 400 may include randomly oriented fibers that are oriented in random directions. In some embodiments, the selectively oriented fibers may be formed by a particular cutting process as described in further detail below with respect to FIG. 5. Alternatively, the randomly oriented fibers may be formed by mixing the plurality of fragments 106 or via natural mixing that occurs during the mechanical recycling process by the mechanical recycling device 104.

The tubing structure 400 further comprises a hollow internal portion 404 extending a length of the tubing structure 400. The hollow internal portion 404 may be configured to receive a fluid such as a gas or liquid material. For example, in some embodiments, the tubing structure 400 is configured to contain a pressurized hydrogen gas or carbon fluid. Accordingly, the tubing structure 400 may be used as a pressure containing structure in systems for gas transport, sequestration, or other pressure containing systems. The composite material, for example, carbon fiber PEEK, is corrosion resistant and thus provides a longer useful like as compared to steel pipes and pipe liners which react with hydrogen resulting in corrosion. Further, the tortuous path generated within the recycled composite material substantially prevents permeation of the hydrogen or other fluid contained in the tubing structure 400. As such, the tubing structure 400 may provide a low permeability pressure seal for containing a fluid inside the pressure containing pipe.

In some embodiments, the tubing structure 400 comprises any number of layers of composite material. For example, in some embodiments, the tubing structure 400 may be formed by curving two or more sheets of recycled composite material with fragments and fibers oriented in one or more random or selectively oriented directions.

In some embodiments, other forms of pressure containing structures are also contemplated. For example, the fabrication techniques described herein may be applied to produce pressure containing structures formed of recycled composite materials such as, valves, valve bodies, tubing connections, pipe liners, pipe covers, and other forms of pressure containing structures. Alternatively, or additionally, embodiments are contemplated in which other structures besides pressure containing structures may be formed of the recycled composite material described herein. For example, the plurality of fragments 106 may be formed into other structures to provide enhanced structural integrity due to the orientation of the fibers included therein and/or based on the distribution of the individual fragments within the structure. As a few examples, the recycled carbon fiber PEEK composite material described herein may be used to form frames, bars, poles, and other structural supporting structures. Further, the recycled carbon fiber PEEK may also be applied in chemical applications in which the corrosion resistance of the carbon fiber PEEK material prevents corrosion of a structure. As yet another example, the recycled carbon fiber PEEK material may also be applied in high-temperature applications, such as power production applications, in which the thermal properties of the carbon fiber PEEK material are suitable to withstand relatively high temperatures. Further still, the recycled carbon fiber PEEK material described herein may be used to form other types of structures not explicitly described herein.

Figure 5:
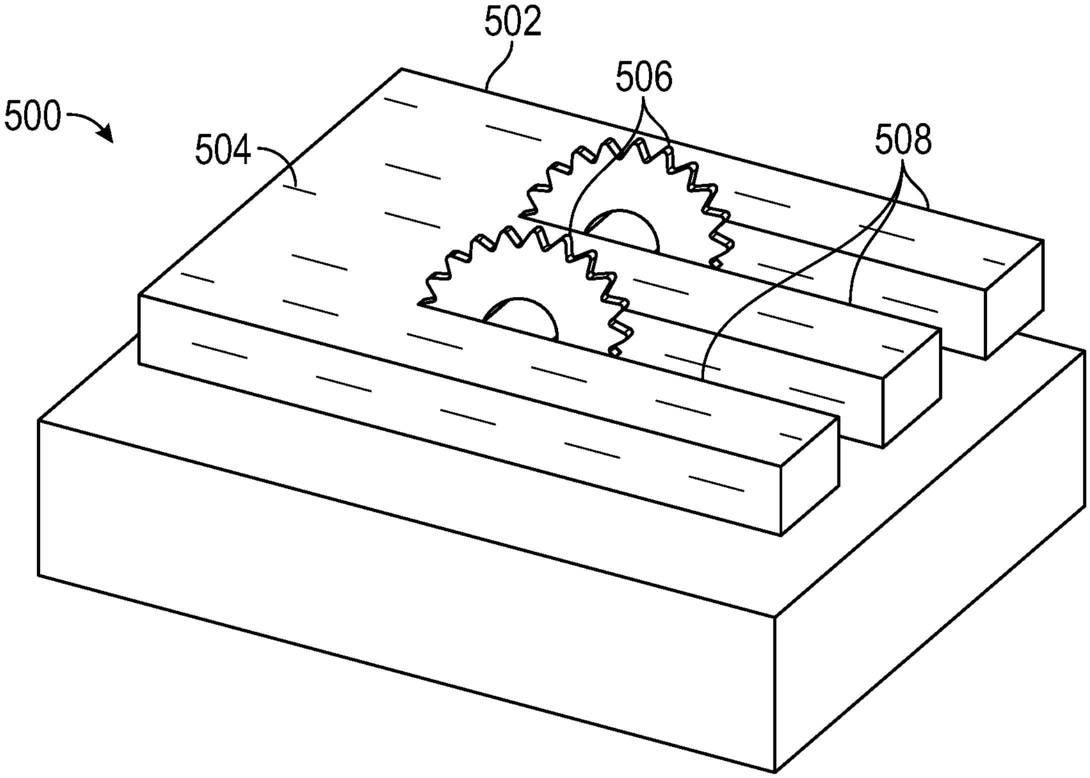
FIG. 5 illustrates a diagram of an exemplary cutting system for generating fragments in a selectively oriented direction relating to some embodiments of the present disclosure.

FIG. 5 illustrates a diagram of an exemplary cutting system 500 for generating fragments in a selectively oriented direction relating to some embodiments of the present disclosure. It should be understood that the cutting system 500 shown is just one example of a system for cutting a part into a plurality of fragments and that a variety of other forms of cutting systems and devices are also contemplated. In some embodiments, a scrap part 502 is positioned on a cutting platform of the cutting system 500, as shown. In some embodiments, the scrap part 502 comprises a plurality of fibers 504 oriented in a particular direction on the scrap part 502.

In some embodiments, the cutting system 500 comprises one or more cutting devices 506 configured to cut the scrap part 502 into a plurality of cut portions 508. Accordingly, it is possible to preserve the orientation of the plurality of cut portions 508 based on the selected cutting direction of the cutting system 500. For example, the scrap part 502 may be positioned on the platform such that the fibers within the scrap part 502 are aligned with the cutting direction and fed into the cutting system to produce cuts on the scrap part 502.

In some embodiments, the cutting system 500 is configured to cut the scrap part 502 along an axis parallel to a direction of the plurality of fibers 504 as to preserve the plurality of fibers 504 within the plurality of cut portions 508. Additionally, or alternatively, in some embodiments, latitudinal cuts are also contemplated. For example, in some embodiments, each of the plurality of cut portions 508 may be cut to a particular length, width, and height. Further, in some embodiments, the cut portions 508 may be further processed into the plurality of fragments 106, as described above, and formed into a new part.

In some embodiments, a similar cutting system may be used to cut recycled unidirectional tape into a plurality of tape fragments for reprocessing into a new structure. However, it should be understood that a different form of cutting system may be used. For example, a cutting system configured to cut the unidirectional tape latitudinally may be used. Additionally, using recycled composite material reduces the high energy consumption associated with initially generating composite materials such as carbon fiber PEEK, as well as the high-cost associated with said composite materials.

Figure 6:
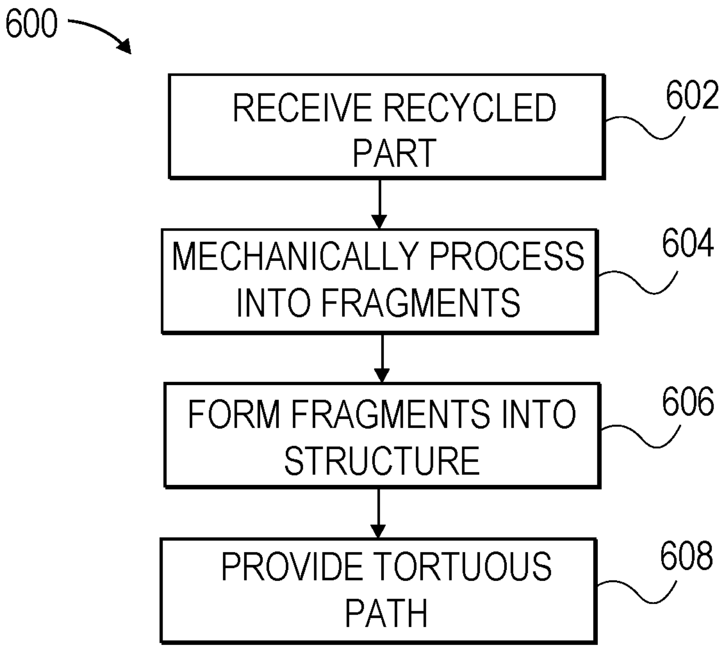
FIG. 6 illustrates an exemplary method of producing a pressure containing structure relating to some embodiments of the present disclosure.

FIG. 6 illustrates an exemplary method 600 of producing a pressure containing structure relating to some embodiments of the present disclosure. Said method 600 may be used to convert a recycled scrap component into a new structure such as a pressure containing structure with improved fluid permeability properties. Further, said method provides a low cost and low energy requirement process for producing new structures while minimizing production of pollutants by employing mechanically recycled materials.

At step 602, at least one recycled part is received. The recycled part may comprise scrap material such as the scrap part 102. For example, the recycled part may include scrap from a wind turbine blade or from an aircraft, in addition to other suitable scrap parts. In some embodiments, the scrap material comprises a composite material such as a carbon fiber composite such as, CF-PEEK.

At step 604, the recycled part is mechanically processed into a plurality of fragments. For example, a mechanical recycling process such as described above using the mechanical recycling device 104 may be executed to chop the recycled part into the plurality of fragments 106. Alternatively, the mechanical processing may utilize the cutting system 500, as described above, to preserve a particular orientation of the plurality of fragments 106.

At step 606, the fragments are formed into a new structure via a formation process. For example, the new structure may be formed via any of extrusion, 3D printing, pressing, or other suitable manufacturing processes not explicitly described herein. In some embodiments, forming the fragments into the new structure may include any of applying heat and applying pressure to the plurality of fragments. For example, in some embodiments, heat may be applied to increase a pliability of the composite material prior to formation. Further still, in some embodiments, the structure may be produced via a sheet forming process such as by pressing the plurality of fragments 106 into a compressed sheet 122. In some embodiments, the new structure is formed by fusing at least a portion of the plurality of fragments 106 together. For example, in some embodiments, the fragments are fused together by an extrusion process by an extrusion device such as the extruder device 110, as described above. In some embodiments, the initial resin matrix of the PEEK material protects the carbon fiber suspended therein from heat and structural damage during the mechanical recycling process of step 604 and the structure formation at step 606. Accordingly, the recycled CF-PEEK material may be processed without damage to the fibers such that the enhanced properties associated with the fibers in the recycled material is preserved.

At step 608, a tortuous path is provided within the new structure to reduce a fluid permeability of the new structure. In some embodiments, the tortuous path may be generated based on the orientation of the plurality of fragments within the new structure. The tortuous path generates a tortuous effect that reduces a permeability of the structure. As such, the new structure may be included in pressure containing applications to contain a pressurized fluid while prevent the fluid from substantially permeating outwards from the structure. For example, the new structure may be utilized as tubing for subsea and surface pipeline and sequestration applications.

In some embodiments, additional steps may be included within the method 600. For example, the recycled materials may be further processed, such as by further grinding or cutting the plurality of fragments 106 or by adding additional fibers, microstructures, adhesives, or other additives to the recycled material. For example, in some embodiments, additional carbon fiber may be added after mechanically recycling a scrap part into a plurality fragments to increase a carbon fiber content of the overall material. For example, a second transformation of the CF-PEEK material may be carried out to impregnate the PEEK material with additional carbon fibers, which provides additional obstacles to mass transfer through the material (i.e., further enhancing the tortuous path). Further, in some embodiments, the recycled material may be heated to separate glue that is already present in the scrap part. For example, the plurality of fragments 106 may be heated to a temperature below a melting point of the composite material but above a melting point of an adhesive additive to melt away the adhesive from the composite material. Further still, additional steps of mixing the plurality of fragments 106 may be included prior to forming at step 606. For example, the plurality of fragments 106 may be mixed to further randomize the orientation of the plurality of fragments 106 and the fibers included therein.

In some embodiments, the method 600 further comprises additional steps for feeding one or more recycled parts into a cutting device configured to cut the one or more recycled parts along an axis parallel to a fiber direction of a plurality of fibers of the carbon fiber composite material to thereby form the plurality of fragments while preserving the plurality of fibers within the fragments. For example, the cutting system 500, described above, may be used to cut the recycled parts and preserve the fibers disposed therein.

Additionally, in some embodiments, a variety of concentrations of carbon fiber within the composite material are contemplated. For example, in some embodiments, the recycled structure comprises a carbon fiber PEEK composite material with between 20% to 50% carbon fiber by volume. However, in some embodiments, other concentrations of carbon fiber not explicitly described herein are contemplated. In some embodiments, additional carbon fiber may be added to the plurality of fragments 106 to increase the carbon fiber concentration above that of the scrap part 102.

Many of the embodiments described above mention using composite materials such as carbon fiber PEEK. However, it should be understood that other suitable composite materials besides PEEK may be used. For example, other polymers belonging to the Polyaryletherketone (PAEK) family of thermoplastics may be used such as, Polyetherketoneketone (PEKK) or Polyetherketone (PEK). Alternatively, or additionally, other suitable polymers such as, Polyethylenimine (PEI) or Polyamide-imide (PAI) may be used in place of PEEK in some embodiments. In some embodiments, an additional polymer material may be added to the plurality of fragments prior to forming the pressure containing structure. For example, any of PEEK, PEKK, PEK, PAI, and PEI, as well as other suitable polymers may be added to the plurality of fragments to increase adhesion and/or reinforce the resin matrix thereof.

Clause 1. A method of producing a pressure containing structure, the method comprising: receiving one or more recycled parts, the one or more recycled parts comprising a carbon fiber composite material; mechanically processing the one or more recycled parts into a plurality of fragments with a random fiber distribution; and forming, via a forming process, the plurality of fragments into the pressure containing structure thereby producing the pressure containing structure, wherein the random fiber distribution of the plurality of fragments generates a tortuous effect thereby producing a low gas permeability for the pressure containing structure for substantially containing a fluid within the pressure containing structure.

Clause 2. The method of clause 1, wherein the carbon fiber composite material comprises carbon fiber polyether ether ketone, and wherein an initial matrix of the carbon fiber composite material protects a plurality of short fibers disposed therein.

Clause 3. The method of any of clause 1 or clause 2, wherein the forming process comprises an extrusion process using an extruder device.

Clause 4. The method of any of clause 1 through clause 3, wherein the forming process comprises an additive manufacturing process using a 3D printer, the method further comprising: processing the plurality of fragments into a powder form comprising a plurality of granules with an average particle diameter of about 10 micrometers to about 100 micrometers; and providing the plurality of granules to the 3D printer.

Clause 5. The method of clause 1 through clause 4, further comprising: selecting a fragment size for the plurality of fragments based on a pressure level associated with the pressure containing structure.

Clause 6. The method of clause 1 through clause 5, wherein the forming process comprises an injection molding process using an injection mold.

Clause 7. The method clause 1 through clause 6, further comprising: forming a first layer of the pressure containing structure using a first portion of the plurality of fragments; and forming a second layer of the pressure containing structure using a second portion of the plurality of fragments.

Clause 8. A method of producing a pressure containing structure, the method comprising: receiving one or more recycled parts, the one or more recycled parts comprising a carbon fiber composite material; mechanically processing the one or more recycled parts to form a plurality of fragments; and forming the pressure containing structure by fusing the plurality of fragments into the pressure containing structure, wherein the plurality of fragments are selectively oriented to generate a tortuous effect thereby producing a low gas permeability for the pressure containing structure for substantially containing a fluid within the pressure containing structure.

Clause 9. The method of clause 8, wherein the plurality of fragments are fused into the pressure containing structure via an extrusion process using an extrusion device.

Clause 10. The method of any of clause 8 or clause 9, further comprising: forming a first layer of the pressure containing structure using a first portion of the plurality of fragments selectively oriented in a first selected direction; and forming a second layer of the pressure containing structure using a second portion of the plurality of fragments selectively oriented in a second selected direction distinct from the first selected direction.

Clause 11. The method of any of clause 8 through clause 10, further comprising: forming a third layer of the pressure containing structure using a third portion of the plurality of fragments selectively oriented in a third selected direction distinct from the second selected direction.

Clause 12. The method of any of clause 8 through clause 11, wherein mechanically processing the one or more recycled parts comprises feeding the one or more recycled parts into a cutting device configured to cut the one or more recycled parts along an axis parallel to a fiber direction of a plurality of fibers of the carbon fiber composite material to thereby form the plurality of fragments while preserving the plurality of fibers.

Clause 13. The method of any of clause 8 through clause 12, further comprising: adding additional carbon fiber material to the plurality of fragments.

Clause 14. The method of any of clause 8 through clause 13, further comprising: adding an additional polymer material to the plurality of fragments prior to forming the pressure containing structure.

Clause 15. A pressure containing pipe comprising: a carbon fiber polyether ether ketone (PEEK) material configured to provide a low permeability pressure seal for containing a fluid inside the pressure containing pipe; and a plurality of fused mechanically recycled fragments comprising the carbon fiber PEEK material, wherein the carbon fiber PEEK material has a random fiber distribution that generates a tortuous effect to thereby reduce a permeability of the pressure containing pipe.

Clause 16. The pressure containing pipe of clause 15, wherein the pressure containing pipe is configured to contain a pressurized gaseous hydrogen fluid disposed therein, and wherein the carbon fiber PEEK material prevents corrosion of the pressure containing pipe.

Clause 17. The pressure containing pipe of any of clause 15 or clause 16, wherein the carbon fiber PEEK comprises a concentration of between 20% to 50% carbon fiber by volume.

Clause 18. The pressure containing pipe of any of clause 15 through clause 17, further comprising: a first layer of carbon fiber composite material with one or more fibers oriented in a first direction; and a second layer of carbon fiber composite material with one or more fibers oriented in a second direction distinct from the first direction.

Clause 19. The pressure containing pipe of any of clause 15 through clause 18, wherein the pressure containing pipe is configured to contain a pressurized hydrogen fluid.

Clause 20. The pressure containing pipe of any of clause 15 through clause 19, wherein the pressure containing pipe is configured to contain a pressurized carbon dioxide fluid.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of producing a pressure containing structure, the method comprising:

receiving one or more recycled parts, the one or more recycled parts comprising a carbon fiber composite material having a plurality of fibers therein;

mechanically processing the one or more recycled parts into a plurality of fragments with a random fiber distribution such that the plurality of fibers within each fragment of the plurality of fragments is arranged in a varied orientation; and forming, via a forming process, the plurality of fragments into the pressure containing structure thereby producing the pressure containing structure, wherein the random fiber distribution of the plurality of fragments generates a tortuous effect thereby producing a low gas permeability for the pressure containing structure for substantially containing a fluid within the pressure containing structure.

2. The method of claim 1, wherein the carbon fiber composite material comprises carbon fiber polyether ether ketone, and wherein an initial matrix of the carbon fiber composite material protects a plurality of short fibers disposed therein.

3. The method of claim 1, wherein the forming process comprises an extrusion process using an extruder device.

4. The method of claim 1, wherein the forming process comprises an additive manufacturing process using a 3D printer, the method further comprising:

processing the plurality of fragments into a powder form comprising a plurality of granules with an average particle diameter of about 10 micrometers to about 100 micrometers; and providing the plurality of granules to the 3D printer.

5. The method of claim 1, further comprising:

selecting a fragment size for the plurality of fragments based on a pressure level associated with the pressure containing structure.

6. The method of claim 1, wherein the forming process comprises an injection molding process using an injection mold.

7. The method of claim 1, further comprising:

forming a first layer of the pressure containing structure using a first portion of the plurality of fragments oriented in a first direction; and forming a second layer of the pressure containing structure using a second portion of the plurality of fragments oriented in a second direction distinct from the first direction.

8. A method of producing a pressure containing structure, the method comprising:

receiving one or more recycled parts, the one or more recycled parts comprising a carbon fiber composite material;

mechanically processing the one or more recycled parts to form a plurality of fragments;

forming the pressure containing structure by fusing the plurality of fragments into the pressure containing structure, wherein the plurality of fragments are selectively oriented to generate a tortuous effect thereby producing a low gas permeability for the pressure containing structure for substantially containing a fluid within the pressure containing structure;

forming a first layer of the pressure containing structure using a first portion of the plurality of fragments selectively oriented in a first selected direction; and forming a second layer of the pressure containing structure using a second portion of the plurality of fragments selectively oriented in a second selected direction distinct from the first selected direction.

9. The method of claim 8, wherein the plurality of fragments are fused into the pressure containing structure via an extrusion process using an extrusion device.

10. The method of claim 8, further comprising:

forming a third layer of the pressure containing structure using a third portion of the plurality of fragments selectively oriented in a third selected direction distinct from the second selected direction.

11. The method of claim 8, wherein mechanically processing the one or more recycled parts comprises feeding the one or more recycled parts into a cutting device configured to cut the one or more recycled parts along an axis parallel to a fiber direction of a plurality of fibers of the carbon fiber composite material to thereby form the plurality of fragments while preserving the plurality of fibers.

12. The method of claim 8, further comprising:

adding additional carbon fiber material to the plurality of fragments.

13. The method of claim 12, further comprising:

adding an additional polymer material to the plurality of fragments prior to forming the pressure containing structure.

14. The method of claim 8, wherein the first portion of the plurality of fragments comprises a first plurality of fibers is oriented in the first selected direction and the second portion of the plurality of fragments comprises a second plurality of fibers oriented in the second selected direction.

15. A pressure containing pipe comprising:

a carbon fiber polyether ether ketone (PEEK) material configured to provide a low permeability pressure seal for containing a fluid inside the pressure containing pipe; and a plurality of fused mechanically recycled fragments comprising the carbon fiber PEEK material, wherein the carbon fiber PEEK material has a random fiber distribution that generates a tortuous effect to thereby reduce a permeability of the pressure containing pipe.

16. The pressure containing pipe of claim 15, wherein the pressure containing pipe is configured to contain a pressurized gaseous hydrogen fluid disposed therein, and wherein the carbon fiber PEEK material prevents corrosion of the pressure containing pipe.

17. The pressure containing pipe of claim 16, wherein the carbon fiber PEEK material comprises a concentration of between 20% to 50% carbon fiber by volume.

18. The pressure containing pipe of claim 15, further comprising:

a first layer of the carbon fiber PEEK material including one or more first fibers oriented in a first direction; and a second layer of carbon fiber PEEK material including one or more second fibers oriented in a second direction distinct from the first direction.

19. The pressure containing pipe of claim 15, wherein the pressure containing pipe is configured to contain a pressurized hydrogen fluid.

20. The pressure containing pipe of claim 15, wherein the pressure containing pipe is configured to contain a pressurized carbon dioxide fluid.

* * * * *